United States Patent
Martellacci et al.

(10) Patent No.: US 11,408,628 B2
(45) Date of Patent: Aug. 9, 2022

(54) ELECTRONIC DEVICE AND METHOD FOR CONTROL OF A BUILDING MANAGEMENT SYSTEM

(71) Applicant: Enerbrain S.R.L., Turin (IT)

(72) Inventors: Marco Martellacci, Turin (IT); Filippo Ferraris, Turin (IT); Alexis Marc Ghislain Susset, Mouthiers-sur-Boeme (FR); Giuseppe Carlo Giordano, Volpiano (IT); Francesca Stefania Freyria, Turin (IT)

(73) Assignee: Enerbrain S.R.L., Turin (IT)

( * ) Notice: Subject to any disclaimer, the term of this patent is extended or adjusted under 35 U.S.C. 154(b) by 1031 days.

(21) Appl. No.: 16/077,955

(22) PCT Filed: Feb. 27, 2017

(86) PCT No.: PCT/IB2017/051131
§ 371 (c)(1),
(2) Date: Aug. 14, 2018

(87) PCT Pub. No.: WO2017/145129
PCT Pub. Date: Aug. 31, 2017

(65) Prior Publication Data
US 2021/0190359 A1     Jun. 24, 2021

(30) Foreign Application Priority Data
Feb. 26, 2016   (EP) ..................... 16157732

(51) Int. Cl.
*F24F 11/62* (2018.01)
*F24F 11/84* (2018.01)
(Continued)

(52) U.S. Cl.
CPC .............. *F24F 11/62* (2018.01); *F24F 11/32* (2018.01); *F24F 11/84* (2018.01); *G05D 23/138* (2013.01);
(Continued)

(58) Field of Classification Search
CPC .. F24F 11/62; F24F 11/32; F24F 11/84; F24F 2110/70; F24F 2221/54; F24F 2221/56;
(Continued)

(56) References Cited

U.S. PATENT DOCUMENTS

| 6,263,260 B1 | 7/2001 | Bodmer et al. |
| 10,240,849 B2 * | 3/2019 | DeLia ..................... F25D 17/06 |

(Continued)

FOREIGN PATENT DOCUMENTS

| CN | 102778009 A | 11/2012 |
| JP | 2012-47412 A | 3/2012 |

(Continued)

OTHER PUBLICATIONS

International Search Report and Written Opinions dated Jun. 6, 2017, issued in PCT Application No. PCT/IB2017/051131, filed Feb. 27, 2017.

(Continued)

*Primary Examiner* — Charles R Kasenge
(74) *Attorney, Agent, or Firm* — Workman Nydegger

(57) ABSTRACT

Electronic device for regulating a thermo-fluidic system for a building, including a heating/cooling system including mixing valves adapted to control flows of hot/cold water within said heating/cooling system, the device including a control unit adapted to:
receive a main signal from a building management system;
receive a predefined reference signal representative of a desired parameter for the building;
(Continued)

receive environmental signals from environmental sensors placed in the building and adapted to measure environmental parameters of said building;

issue a control signal towards an actuator associated with a respective mixing valve in order to modify the opening or closing thereof.

5 Claims, 4 Drawing Sheets

(51) Int. Cl.
*F24F 11/32* (2018.01)
*G05D 23/13* (2006.01)
*F24F 110/70* (2018.01)

(52) U.S. Cl.
CPC ...... *G05D 23/1393* (2013.01); *F24F 2110/70* (2018.01); *F24F 2221/54* (2013.01); *F24F 2221/56* (2013.01)

(58) Field of Classification Search
CPC .... F24F 2110/00; F24F 11/30; G05D 23/138; G05D 23/1393; G05D 23/1919; Y02B 30/70

See application file for complete search history.

(56) References Cited

U.S. PATENT DOCUMENTS

| | | |
|---|---|---|
| 10,718,539 B2 | 7/2020 | Matsuoka et al. |
| 2004/0129413 A1* | 7/2004 | Yoho, Sr. .............. F24F 3/08 165/218 |
| 2005/0167080 A1* | 8/2005 | Yoho, Sr. .............. F24F 3/08 165/48.1 |
| 2005/0278069 A1 | 12/2005 | Bash et al. |
| 2011/0112693 A1 | 5/2011 | Ye et al. |
| 2016/0003517 A1* | 1/2016 | DeLia .................. F25D 13/00 62/186 |

FOREIGN PATENT DOCUMENTS

| | | |
|---|---|---|
| RU | 116 609 U1 | 1/2012 |
| WO | 2008/085153 A1 | 7/2008 |
| WO | 2008/085153 A2 | 7/2008 |

OTHER PUBLICATIONS

Velimir Congradac et al., *HVAC System Optimization with $CO_2$ Concentration Control Using Genetic Algorithms*, Energy and Buildings, vol. 41, 2009, pp. 571-577.

Servet Soyguder et al., *Design and Simulation of Self-Tuning PID-Type Fuzzy Adaptive Control for an Expert HVAC System*, Expert Systems with Application, vol. 36, 2009, pp. 4566-4573.

International Preliminary Report on Patentability dated Aug. 28, 2018, issued in PCT Application No. PCT/IB2017/051131, filed Feb. 27, 2017.

Russian Search Report dated Jul. 29, 2020, issued in Russian Application No. 2018133613.

Russian Office Action dated Jul. 29, 2020, issued in Russian Application No. 2018133613.

* cited by examiner

ELECTRONIC DEVICE AND METHOD FOR CONTROL OF A BUILDING MANAGEMENT SYSTEM

BACKGROUND OF THE INVENTION

1. The Field of the Invention

The present invention relates to an electronic device and a method for regulating thermo-fluidic installations for buildings.

2. The Relevant Technology

Environmental comfort optimization in buildings is a theme that is becoming increasingly important. The scientific literature reports a considerable number of research works that show how several aspects of comfort, particularly thermal comfort and air quality, are directly connected to the occupants' well-being and, in working environments, to their productivity.

Very often, maintaining desired values of parameters such as temperature, relative humidity and pollutant concentration in an environment is neither simple nor economical. According to the intended use of the building, to the type of installation installed therein and to the times and modes of occupation thereof, environmental parameters can be controlled in various ways.

Although thermo-fluidic systems are available on the market which include state-of-the-art integrated control and regulating systems, most installations installed in tertiary buildings are controlled by control logics based on standard values, as opposed to actual environmental requirements.

Very often, in fact, indoor air temperatures are regulated on the basis of the value of the outdoor air temperature (open loop control).

In these cases, the hot water produced by a generation system associated with the building to control is mixed with recirculation water in order to supply the distribution system of the building with water at a temperature determined on the basis of outdoor temperatures. Thus, the generation system requires the presence of an external temperature sensor and a mixing valve located downstream of hot water generation and upstream of water distribution in the distribution system of the building.

In case of water installations with thermal control only, i.e., heating or cooling through emission systems such as radiators, fan coil units, radiating panels, etc., the typical operation of the thermo-fluidic installations follows the above-described logics.

In the case of combined air-water systems or air-only systems, wherein thermal control is supplemented with air quality control, the regulation is much more complex. The external or recirculation air, prior to being delivered into the environment, needs to be appropriately treated, i.e., heated, cooled or dehumidified as necessary.

In these cases, the regulation is carried out on two levels: the first level relates to heating/cooling the fluids to be supplied to heating/cooling batteries of ATUs (Air Treatment Units) via mixing valves.

The second level concerns the supply of treated air into an environment through adjustable gates.

From a thermal viewpoint, the fluids follow control logics that are similar to those employed for water installations.

Regarding the regulation of the air flows into the environment, the control acts both upon gates for inlet of external air (which determine the fractions of fresh and recirculated air) and upon gates for recovery of exhausted air coming from the same environment, and upon gates placed on the ducts that lead to air inlet terminals present in the environment.

Currently, in most cases the regulation devices (mixing valves and gates) are integrated into the installations themselves, but their operation is dictated by standard practices wherein fixed values based on design data and not on actual environmental requirements are set. Since these are power-consuming systems, a wrong approach to installation regulation implies higher energy costs.

Closed-loop control of environmental conditions from the building itself would allow, on one hand, to keep the comfort in the building under control more effectively, while on the other hand it would allow taking into account any free energy contributions (solar irradiation, illumination, number of people in the building, presence of computers and/or printers, etc.) in the environment under treatment.

This closed-loop control is currently not being effected because it would require excessively complex and expensive modifications to the control units of such systems.

SUMMARY OF THE INVENTION

Object of the present invention is therefore to propose an electronic device and a method for controlling thermo-fluidic installations used in buildings which allows controlling in closed-loop mode the environmental conditions of a building without requiring complex interventions on existing systems.

This and other objects are achieved by means of an electronic device for controlling a thermo-fluidic installation whose features are defined in claim 1, and a method for regulating the temperature and carbon dioxide level of a thermo-fluidic installation as set out in claims 4 and 5.

Particular embodiments are set out in dependent claims, whose contents is to be understood as an integrating part of the present description.

BRIEF DESCRIPTION OF THE DRAWINGS

Further characteristics and advantages of the invention will become apparent from the following detailed description, given merely by way of non-limiting example with reference to the annexed drawings, wherein.

DETAILED DESCRIPTION OF THE PREFERRED EMBODIMENTS

Figure 1:
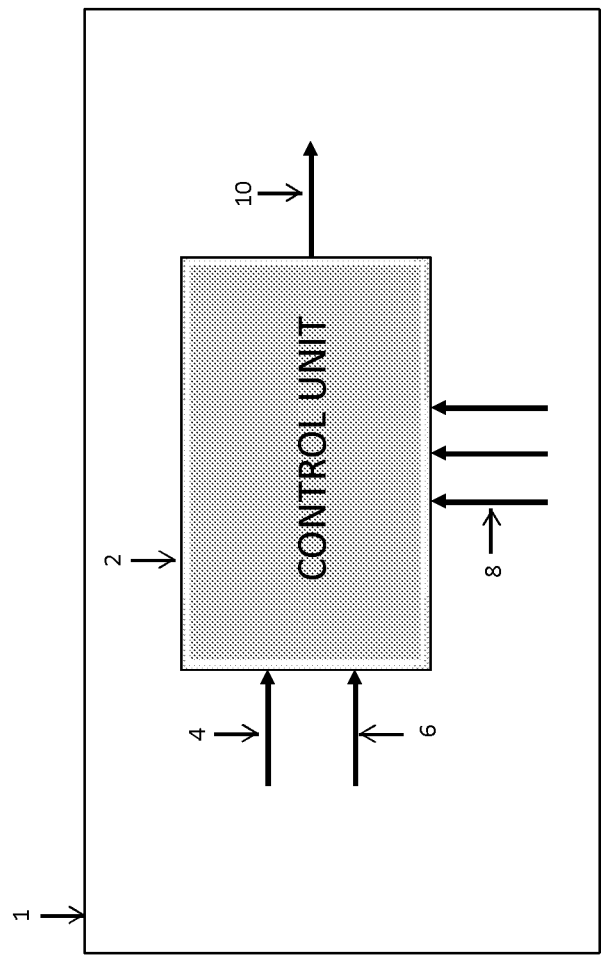
FIG. 1 shows a block diagram of the electronic device according to the present invention.

FIG. 1 shows a device for controlling the climatic conditions of a building according to the present invention.

The device 1 is adapted to be associated with a traditional heating/cooling system of a building (of the type including a heating or cooling unit that sends hot or cold water towards a distribution system of a building by opening/closing a mixing valve), or more in general with an HVAC (Heating, Ventilation and Air Conditioning) system also comprising, as aforementioned, an air treatment unit.

Figure 2:
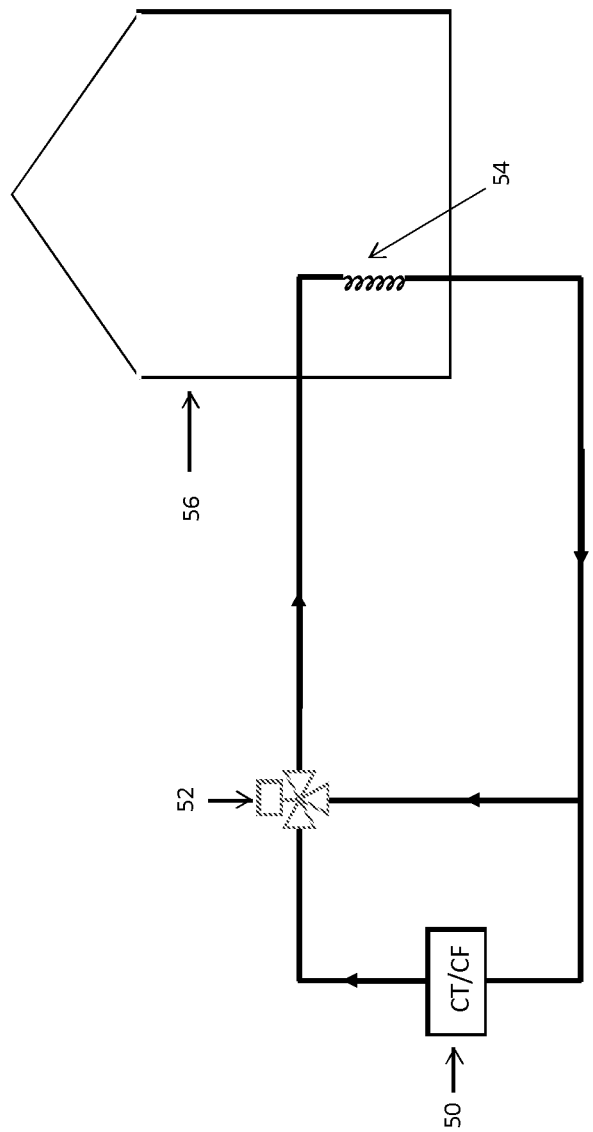
FIG. 2 shows a diagram of a building wherein climatic conditions are controlled by means of an open-loop system.

FIG. 2 shows a traditional heating system comprising a heating unit 50 (or, as an alternative, a cooling unit), a mixing valve 52 and a heating device 54 (or, as an alternative, a cooling device) of a building 56. Hot (or cold) water is delivered by the unit 50 towards the building 56 in the direction shown by the arrow A by opening/closing the mixing valve 52.

Figure 3:
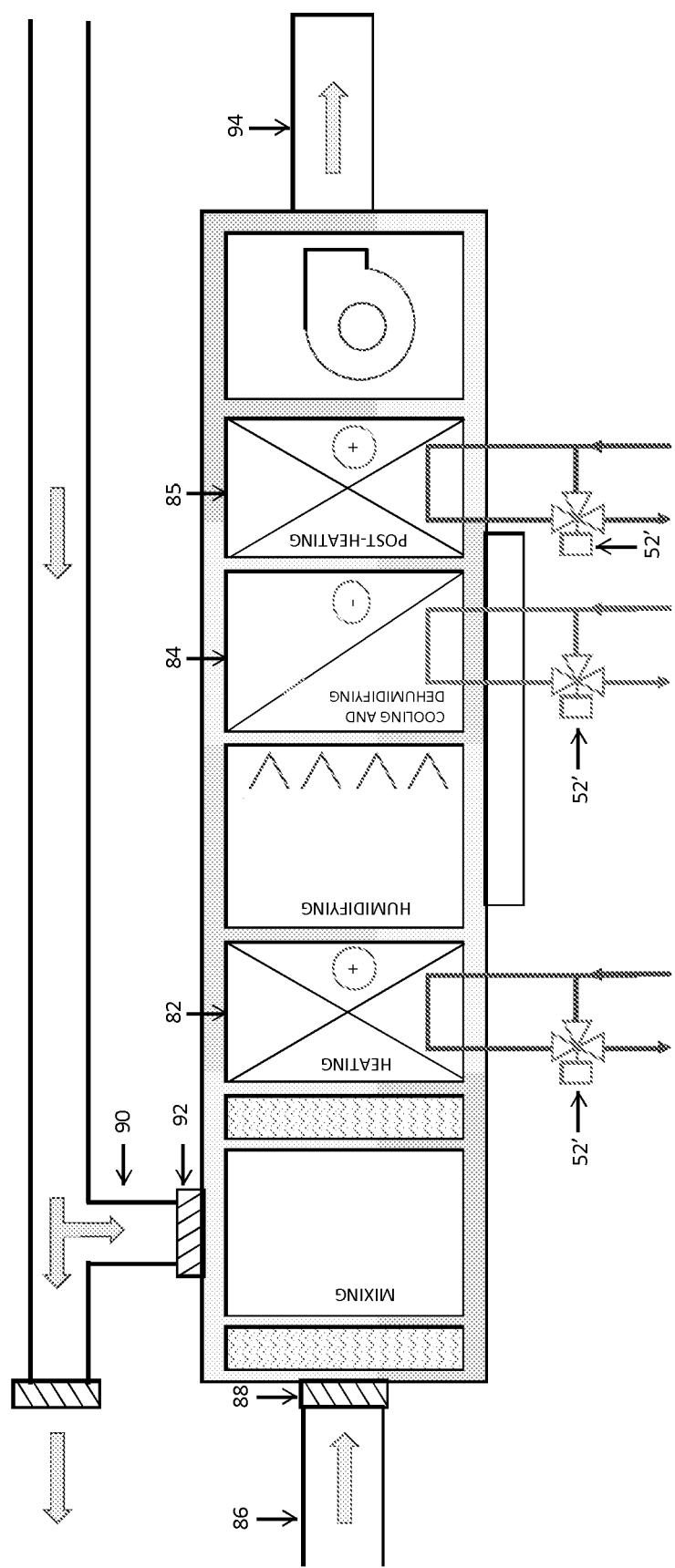
FIG. 3 shows a diagram of an air treatment unit.

FIG. 3 shows an ATU 80 including a heating battery 82, a cooling battery 84 and a post-heating battery 85.

A first duct 86 allows external air to enter and flow, through a first gate 88, towards the ATU 80, while a second duct 90 ensures recirculation of air coming from a building (not shown in the drawing) towards the ATU 80, through a second gate 92.

Mixing valves 52', similar to the mixing valve 52, are associated with the heating battery 82, the cooling battery 84 and the post-heating battery 85, which valves are adapted to control the hot/cold water flows within the ATU 80 in order to heat/cool outside air or recirculated air.

The treated air then flows out of the ATU 80 and is sent, through a third duct 94, towards the building to control.

Referring back to FIG. 1, the device 1 comprises a control unit 2, e.g., a microprocessor, which is adapted to receive:
- a main signal 4 coming from a per se known building management system (BMS);
- a reference signal 6, preferably a temperature signal, set by a user and representative of a desired parameter for the building involved;
- environmental signals 8, coming from environmental sensors located in the building (not shown in the drawing), which are adapted to measure environmental parameters such as temperature, humidity, carbon dioxide level, etc.

The building management system is an existing system associated with the controlled building and adapted to supply control signals to the mixing valves 52, 52' and/or to the gates 88, 92 for opening/closing the air ducts 86, 90 of the ATU 80.

The control unit 2 is adapted to issue a control signal 10 towards an actuator of a respective mixing valve 52, 52' or gate 88, 92. In particular, such control signals 10 are sent to respective actuators of the valves 52, 52' and of the gates 88, 92, which respectively open/close the valves 52, 52' and the gates 88, 92.

The control unit 2 is powered in a per se known manner, e.g., via a 24V or 220V power signal.

In order to obtain the control signal 10, the control unit 2 carries out a temperature regulation process and/or a carbon dioxide level regulation process, respectively, which will be described more in detail below.

The device 1 according to the present invention is an electronic device capable of creating a closed-loop system in a heating/cooling system of a building by integrating the information coming from the environmental sensors.

The actuators that receive a respective control signal 10 are adapted to change the percentage of opening of a three-way mixing valve 52, 52' or the percentage of opening of a gate 88, 92.

The device 1 is installed upstream of each actuator, between the cable that carries the main signal 4 and the actuator itself.

In a preferred embodiment of the invention, the control signal 10 proposes a modification to the main signal 4 to be applied to the actuator.

Through the control actuators, one can regulate the opening/closing of the gates 88, 92 of the air treatment unit 80 and the flow rate of hot/cold water coming from the heating/cooling units in order to attain the desired comfort.

The control device 1 according to the present invention allows reducing the costs for integration into existing systems.

It operates according to the IoT (Internet of things) logics; it can read analog signals and, through an elaboration, create new ones.

Figure 4:
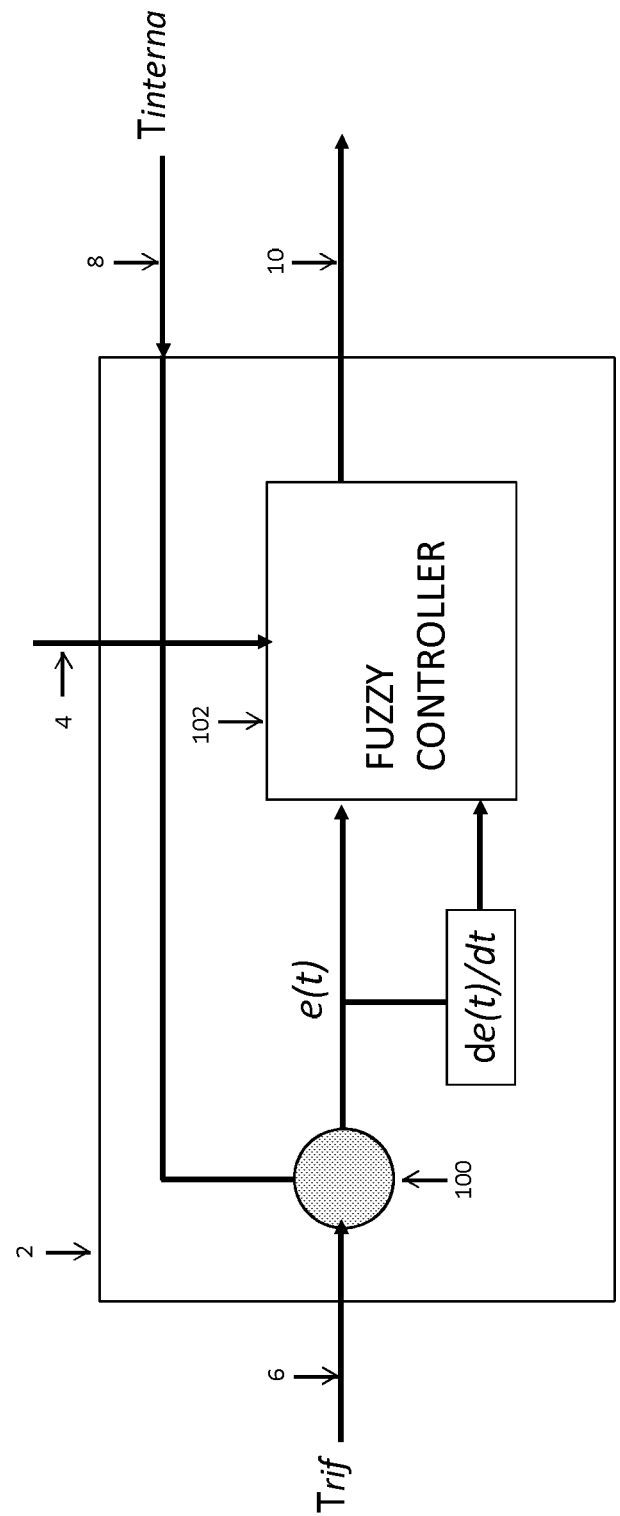
FIG. 4 show a block diagram of the method for regulating the temperature/carbon dioxide level carried out by the device of FIG. 1.

FIG. 4 shows a block diagram of the temperature regulation method performed by the control unit 2 for regulating the temperature in the building.

This method is preferably based on fuzzy, fuzzy PID like or possibly fuzzy PID algorithms.

The fuzzy logic is used because it allows regulating a system via formalization of concepts derived from common experience. These types of regulation algorithms offer very good performance and do not require mathematical modelization of the system being controlled, nor they require that an estimation of PID regulation parameters which are not always intuitive.

The idea at the basis of these algorithms is that a quantity can also take, in addition to Boolean values, a set of values which indicate the degree of truthfulness of a given expression.

The temperature regulation method according to the present invention employs, in order to regulate the building's internal temperature, an algorithm whereby a control signal 10 is obtained which, by opening or closing the valve 52, 52' or a gate 88, 92 of the air treatment unit 80, allow to get the desired temperature (or carbon dioxide level) inside the building.

In FIG. 4, a reference value, e.g., a reference temperature Trif, is defined by the user and sent to the control unit 2 via the temperature signal 6. A sum block 100 in the control unit 2 computes the error $e(t)$ between the reference temperature Trif and an internal temperature of the building Tinterna measured by a temperature sensor installed inside the building and sent to the control unit 2 via one of the environmental signals 8.

The error $e(t)$ and its first derivative $de(t)/dt$ are sent to a fuzzy controller block 102 of the control unit 2, which, through a per se known fuzzy algorithm, compares the main signal 4 with the error signals $e(t)$ and $de(t)/dt$ and in turn produces the control signal 10 directed towards a valve 52, 52'.

Preferably, the device 1 sends a 0V to 10V signal to the actuator of the valve 52, 52' to open/close.

As far as the carbon dioxide level regulation is concerned, the control signal 10 is computed by following a scheme similar to that of FIG. 4 on the basis of a reference carbon dioxide level value Crif and a measured carbon dioxide level value Cinterno, and is sent to the opening/closing gate 88, 92 of the air treatment unit 80 of the HVAC system.

Two input variables are used by the above-described control algorithm for both the temperature regulation and the carbon dioxide regulation, i.e., the regulation error $e(t)$ and its derivative $de(t)/dt$.

In the methods according to the present invention, the error $e(t)$ and its variation $\Delta e(t)$ are used as an antecedent. The fuzzy implication between these variables and the control signal 10 can be derived from the existing literature (see, for example, the article "Design and simulation of self-tuning PID-type fuzzy adaptive control for an expert HVAC system" by Servet Soyguder, Mehmet Karakose, Hasan Alli, ELSEVIER, Expert Systems with Applications 36 (2009) 4566-4573 or the article "Self-Tuning Fuzzy PI Controller and its Application to HVAC Systems" by A. K.

Pal and R. K. Mudi, INTERNATIONAL JOURNAL OF COMPUTATIONAL COGNITION (HTTP://WWW.IJCC.US), VOL. 6, NO. 1, MARCH 2008.

Of course, without prejudice to the principle of the invention, the forms of embodiment and the implementation details may be extensively varied from those described and illustrated herein by way of non-limiting example, without however departing from the protection scope of the present invention as set out in the appended claims.

The invention claimed is:

1. An electronic device for regulating a thermo-fluidic installation for a building, comprising a heating/cooling system including mixing valves or gates adapted to control flows of hot and/or cold water within said heating/cooling system, said device comprising a control unit adapted to:
   receive a main signal from a building management system;
   receive a predefined reference signal representative of a desired parameter for the building;
   receive environmental signals from environmental sensors placed in the building and adapted to measure environmental parameters of said building;
   issue a control signal towards an actuator associated with a respective mixing valve or gate in order to modify opening or closing thereof, wherein:
   said electronic device is adapted to be installed between a cable that carries said main signal and said actuator associated with said respective mixing valve or gate,
   said control unit further comprises:
      a sum block adapted to compute an error (e(t)) between a reference temperature and an internal temperature ($T_{interna}$) measured inside said building;
      a derivative block adapted to derive an error first derivative (de(t)/dt) of said error signal (e(t)); and
      a fuzzy controller block adapted to apply a fuzzy algorithm in order to compare said main signal with said error (e(t)) and said error first derivative (de(t)/dt) signals, so as to obtain said control signal directed towards said respective mixing valve or gate.

2. The device according to claim 1, wherein the thermo-fluidic system for a building further comprises an air treatment unit including gates allowing the entry of air from outside the building or recirculation air from said building into the air treatment unit, said device being also adapted to send a control signal to an actuator associated with a respective gate in order to control the opening or closing thereof.

3. The device according to claim 1, wherein the control signals propose modifications of the main signal for obtaining a predetermined percentage of opening or closing of said mixing valves or said gates.

4. A method for regulating, by an electronic device, a temperature of a thermo-fluidic installation for a building comprising a heating/cooling system having mixing valves adapted to control flows of hot and/or cold water within said heating/cooling system,
said electronic device comprising a control unit adapted to:
   receive a main signal from a building management system;
   receive a predefined reference signal representative of a desired parameter for said building;
   receive environmental signals from environmental sensors placed in said building and adapted to measure environmental parameters of said building;
   issue a control signal towards an actuator associated with a respective mixing valve in order to modify opening or closing thereof,
said method comprising the steps of:
   connecting said electronic device with a cable that carries the main signal and a respective actuator associated with one of said mixing valves;
   receiving a reference temperature signal ($T_{rif}$);
   computing an error (e(t)) between the reference temperature and an internal temperature ($T_{interna}$) measured inside the building;
   computing a first derivative of the error (de(t)/dt);
   applying a fuzzy algorithm in order to compare the main signal with the error (e(t)) and error first derivative (de(t)/dt) signals, so as to obtain the control signal directed towards said mixing valve.

5. A method for regulating, by an electronic device, a carbon dioxide level of a thermo-fluidic installation for a building comprising a heating/cooling system including gates adapted to control flows of hot and/or cold water within said heating/cooling system,
said electronic device comprising a control unit adapted to:
   receive a main signal from a building management system;
   receive a predefined reference signal representative of a desired parameter for said building;
   receive environmental signals from environmental sensors placed in said building and adapted to measure environmental parameters of said building;
   issue a control signal towards an actuator associated with a respective gate in order to modify opening or closing thereof,
said method comprising the steps of:
   connecting said electronic device with a cable that carries the main signal and a respective actuator associated with one of said gates;
   receiving a reference carbon dioxide level signal ($C_{rif}$);
   computing an error (e(t)) between the reference carbon dioxide level and an internal carbon dioxide level ($C_{interno}$) measured inside the building;
   computing a first derivative of the error (de(t)/dt);
   applying a fuzzy algorithm in order to compare the main signal with the error (e(t)) and error first derivative (de(t)/dt) signals, so as to obtain the control signal directed towards said gate.

* * * * *